(No Model.)
E. D. PRIEST.
COMMUTATOR CONNECTOR.
No. 495,058. Patented Apr. 11, 1893.
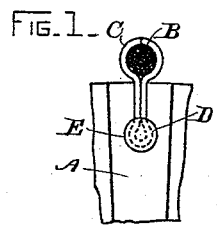
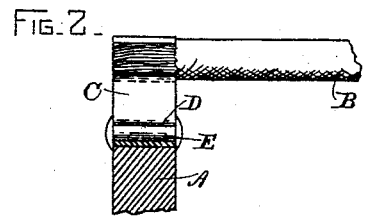
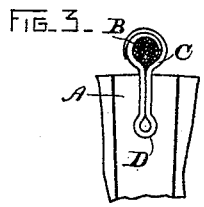
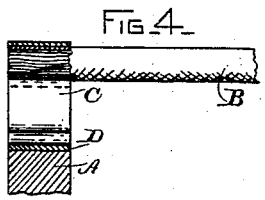
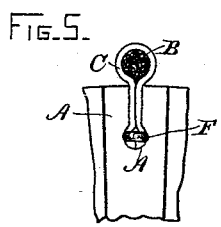
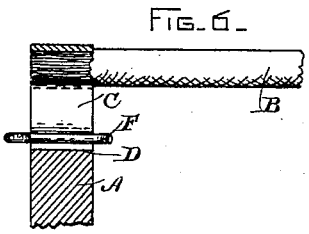
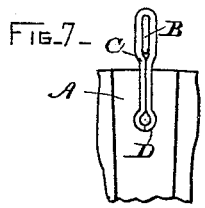
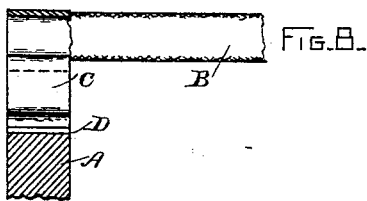
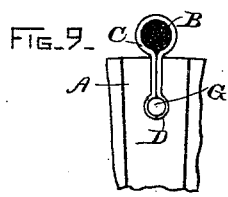
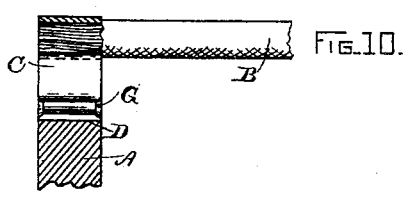
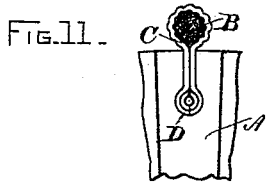
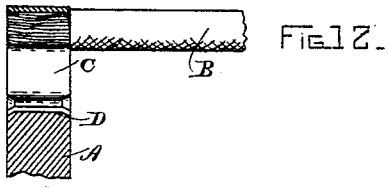
WITNESSES
Alec F. Macdonald.
A. C. Orne
INVENTOR.
Edward D. Priest
by Bentley & Blodgett
Attys.
THE NORRIS PETERS CO., PHOTO-LITHO., WASHINGTON, D. C.

UNITED STATES PATENT OFFICE.

EDWARD D. PRIEST, OF LYNN, MASSACHUSETTS, ASSIGNOR TO THE GENERAL ELECTRIC COMPANY, OF NEW YORK.

COMMUTATOR-CONNECTOR.

SPECIFICATION forming part of Letters Patent No. 495,058, dated April 11, 1893.

Application filed November 16, 1892. Serial No. 452,116. (No model.)

*To all whom it may concern:*

Be it known that I, EDWARD D. PRIEST, a citizen of the United States, residing at Lynn, county of Essex, State of Massachusetts, have invented a certain new and useful Improvement in Commutator-Connectors, of which the following is a specification.

The object of my present invention is to provide means for connecting the lead wires extending from the armature winding of a dynamo electric machine to the commutator segments in a manner not only securing a good electrical and mechanical connection but also superior ease of construction and repair. The mode most commonly practiced heretofore has been to insert the end of the lead wire into a hole bored or drilled in the segment and to fasten it therein. This, however, is objectionable, particularly in commutators having a large number of segments and in which the width of each segment is reduced to narrow limits, for if a hole be drilled therein large enough to receive the lead wire so much of the metal of the segment is removed as to leave it unduly weak at this point. It has also been proposed to connect the lead wires to the segments by means of separate clips passing around the ends of the lead wires and inserted in slots formed in the segments, the clips being held in place by a binding wire wound around the commutator. My construction is in some respects similar to this last described, and may be regarded as an improvement upon it in order that each of the clips and lead wires may be independently replaceable more readily. When a binding wire is used to hold the clips in place it is necessary to cut it whenever one of the connectors or lead wires is to be replaced, and unless solder is used in addition, the wire does not furnish so secure a mechanical connection as is desired. In my invention I bring the lead wires out over the commutator segments, and attach them thereto by separate connectors made of flexible metal of good conducting quality, which are seated in comparatively narrow slots sawed in the ears of the segments, and are at one end secured to the lead wires, while their inner ends are given a firm hold upon the segments sufficient to keep them in place without a binding wire, and also without solder, though of course solder may be used if desired. A number of generally similar methods may be employed for securing the connectors to the segments, the best consisting of expanding the inner end of the connector into a loop or enlarged portion fitting a correspondingly shaped enlarged recess in the segment, and if necessary plugged therein.

In the accompanying drawings Figures 1 and 2 respectively are end and sectional views of a portion of a commutator segment and my connector applied thereto. Figs. 3 and 4 are corresponding views of a modification, and the remaining views likewise show in end elevation and section still further modifications.

The commutator segment is shown at A, and is of any preferred form and construction. The lead wires are shown at B having bared ends brought out over the segments, and connected thereto by clips or connectors C. In the end of the commutator segment there is drilled a hole or recess D a short distance from its outer surface, and the metal between the recess and the periphery is milled out so as to form a slot of somewhat smaller width than the diameter of the recess. The connector consists of a piece or sheet of metal which is a good conductor and possesses considerable elasticity, such as phosphor-bronze. The strip is bent upon itself into such shape as to form a loop passing around the end of the lead wire, a narrow contracted central portion entering the slot in the segment, and a loop or enlarged inner end fitting the recess in the segment and preventing the connector from being drawn outward through the slot. The connector is pushed in place laterally and forms a secure and particularly good electrical connection. Displacement is only possible sidewise, and this may be prevented, if found necessary, by soldering, plugging or expanding the ends of the connector in any well known manner. The lead wire may be secured in the clip either before or after its insertion into the segment. The different modifications shown in the drawings will be readily understood.

In Fig. 1 the ends of the connector meet over the lead wire, and through the loop at the inner end of the connector is passed a rivet E guarding against lateral or vertical displacement. As shown in Fig. 3 the ends of the connector overlap above the lead wire, and the connector is simply forced into the slot or recess in the segment without a pin or other special securing means. In Fig. 5 the joint between the meeting ends of the connector is at its inner looped end, rather than over the lead wire, and a cotter F is passed therethrough. Figs. 7 and 8 show very much the same construction except that the lead wire is of a different shape and no cotter is used. Fig. 9 represents a construction similar to Fig. 5 with a rivet or pin G for securing the connector in place, and Fig 11 shows a fluted or corrugated connector with the edges of the recess in the segment slightly countersunk, and the ends of the clip correspondingly flared by a prick punch so as to give the effect of a rivet guarding against displacement although no separate rivet is actually used.

Solder may be used or may not, but I generally prefer to do so because of the better conductivity which it secures. Experience, however, has shown that if the connectors are simply pushed into place as in Figs. 3 and 7 and held by friction, no difficulty is experienced in handling currents of moderate strength.

What I claim as new, and desire to secure by Letters Patent, is—

1. A commutator segment having a slot leading from its outer surface and terminating in an enlarged recess, and means for joining an armature lead wire thereto consisting of a connector surrounding the lead wire, and passed through said slot into the recess, and there provided with means for securing it in place.

2. A commutator segment slotted and recessed as described, and a connector for joining the lead wire thereto consisting of a strip of flexible good conducting metal having a contracted portion entering said slot, and enlarged end portions, one inclosing and holding the lead wire, and the other fitting said recess and securing the connector in place, as described.

3. A commutator slotted and recessed as described, a lead wire brought out to the outer surface of the segment above the slot, and a connector consisting of a strip of flexible metal bent to form a loop to inclose the lead wire, a contracted portion entering the slot, and a looped or enlarged portion fitting the recess in the segment and holding the connector in place.

4. A commutator segment slotted and recessed as described, a connector holding the lead wire in place, and consisting of a strip of flexible metal connected to the lead wire and a plug securing the connector in the recess of the segment, as described.

5. The herein described means for connecting lead wires for dynamo electric machines to the commutator segments consisting of a separate connector for each lead wire inserted in slots in the corresponding segments and attached to the lead wires, which are themselves outside the slots, and means for securing each connector independently to its corresponding segment so that the connectors may be individually and readily replaceable, as described.

In witness whereof I have hereto set my hand this 9th day of November, 1892.

EDWARD D. PRIEST.

Witnesses:
JOHN W. GIBBONEY,
BENJAMIN B. HULL.